(No Model.)

D. MANUEL & G. H. BURROWS.
DAMPER.

No. 310,696. Patented Jan. 13, 1885.

WITNESSES:
Otto Berger
C. Sedgwick

INVENTOR:
D. Manuel
G. H. Burrows
BY Munn & Co.
ATTORNEYS.

UNITED STATES PATENT OFFICE.

DAVID MANUEL, OF HYDE PARK, AND GEORGE H. BURROWS, OF BOSTON, MASSACHUSETTS.

DAMPER.

SPECIFICATION forming part of Letters Patent No. 310,696, dated January 13, 1885.

Application filed May 2, 1884. (No model.)

*To all whom it may concern:*

Be it known that we, DAVID MANUEL, of Hyde Park, in the county of Norfolk and State of Massachusetts, and GEORGE H. BURROWS, of Boston, in the county of Suffolk and State of Massachusetts, have invented a new and Improved Damper, of which the following is a full, clear, and exact description.

This invention has for its object to provide a damper for stove-pipes, so constructed that the ascending air and products of combustion, while being permitted a sufficiently free passage, will be so retarded that a perfect combustion of the fuel, combustible gases, &c., will be obtained, none of the resulting heat will be wasted, and at the same time a perfect control of the fire will be secured.

To this end our invention consists in a damper consisting of two disks, flat at their central portions, and concavo-convex at their outer portions and having openings through said outer portions, whereby, when the two disks are secured together upon their concave sides, an annular chamber will be formed between the two disks, and the openings in said disks will alternate with each other.

Our invention further consists in means for securing the two disks together, and also in a plate having lugs adapted to enter recesses in the shoulder of the handle of the damper, and in a spring for causing the shoulder of the handle to bear upon the said plate.

Reference is to be had to the accompanying drawings, forming part of this specification, in which similar letters of reference indicate corresponding parts in both the figures.

Figure 1:
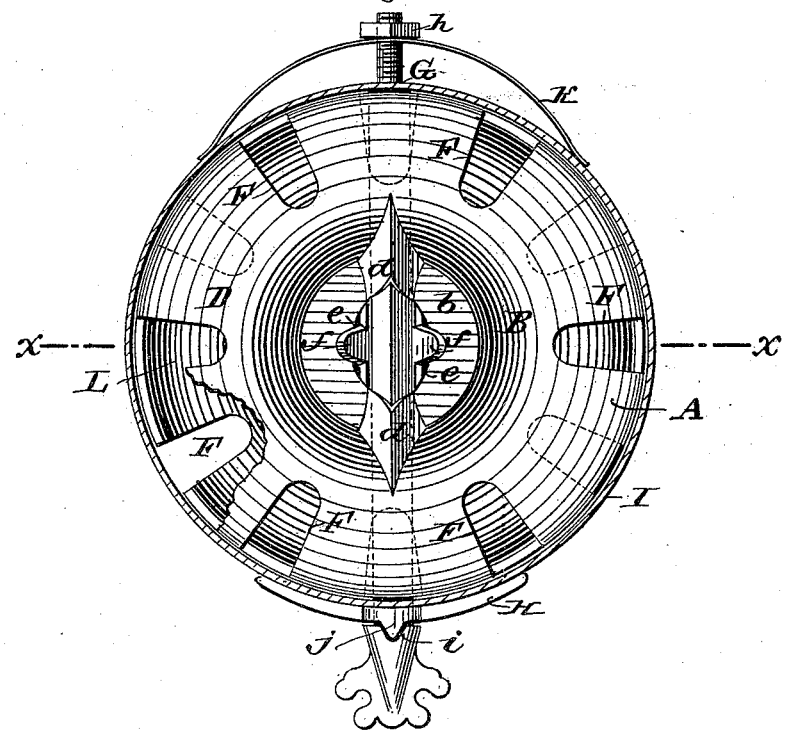
Figure 2:
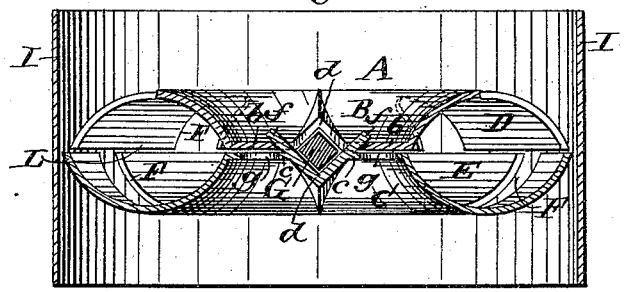

Figure 1 is a transverse section of a stove-pipe and a plan view of our improved damper as applied thereto, a part of the damper being broken away; and Fig. 2 is a section of the same on the line $x\ x$ in Fig. 1.

The damper A consists of two disks, B and C, flat at their central portions, $b\ c$, and curving radially from said central portions to their peripheries, the said curves terminating in the same plane as that face of the flat portions of disks which is on the concave side of said disks, whereby concavo-convex portions D and E are formed outside of their flat portions $b\ c$. Openings are formed through said disks, as shown, recesses F extending from their peripheries toward the center. The said openings or recesses are so located that when the disks are secured together the openings in one disk will alternate with the openings in the other disk.

Diametrically across the flat portions of the disks hollow ridges $d$ are formed, and in line with the same notches are cut in the edge of the disk C.

In the portion $b$ of the disk B an oval opening, $e$, is made, and from the portion $c$ of the disk C lugs $f$ project, adapted to enter the opening $e$ at its longer diameter. The disk C is cut away at $g$ for the purpose of lightening the same.

The stem G of the damper is made square, as usual, and has a thread cut upon its smaller end for a nut, $h$, and in the shoulder of its handle recesses $i$ are formed, adapted to fit over lugs $j$, formed upon a plate, H, to be secured to the stove-pipe I, through which plate the stem G passes freely. A curved spring, K, having a central aperture, is passed over the threaded end of the stem, and is secured thereon by the nut $h$ with its ends bearing upon the pipe I.

The disks B and C may be held together in any suitable manner, as well as in the manner described—as, for instance, by rivets or bolts. The two disks B and C are placed with their concave sides together in such manner that the lugs $f$ of the disk C will pass through the opening $e$ of the disk B. The disk C is then turned a quarter around, whereby the lugs $f$ will secure the two disks together, the united disks forming a damper, A, having an annular internal chamber, L, the openings F of one disk alternating with the openings of the other disk, and the ridges $d$ forming a square aperture for the stem. The damper is then placed in the stove-pipe, and the stem passes through the pipe and damper in the usual manner. The plate H having been first secured in place upon the pipe, the spring K is then placed upon the threaded end of the stem and the nut $h$ screwed down upon it, whereby, when the damper is closed, the lugs $j$ of the plate H will enter the recesses $i$ of the handle of the stem, the damper will be held closed, and cannot be accidentally moved. The damper will be held in any other position by the friction of the lugs $j$ against the shoulder of the handle.

With this damper ample room is provided for the escape of the products of combustion, the smoke, &c., passing through the openings of one disk into the annular chamber L and thence off through the openings of the other disk, whereby a large volume of air, smoke, &c., is allowed to pass, but with a slow movement, a perfect combustion of the fuel and gases is secured, and a perfect regulation of the fire is obtained. The peculiar form of the damper and arrangement of its openings tend to cause the heated air and gases to mix, and all combustible parts thereof to be consumed instead of passing off to waste.

Having thus described our invention, what we claim as new, and desire to secure by Letters Patent, is—

1. A damper composed of two united disks having flat portions $b\ c$ and curved portions D E, forming a circular passage, openings F, alternately formed in said curved portions D E, and a socket or bearing for a damper-rod formed in said flat parts $b\ c$ and curved portions D E, substantially as set forth.

2. A damper consisting of two united disks so made that an internal annular chamber is formed in said damper, and having openings through each disk into said chamber, with provision for the passage of the stem through said damper, substantially as specified.

3. In a damper, the disk B, having a flat portion, $b$, and a portion, D, curved upon the radial lines, and provided with openings F, in combination with the disk C, having a flat portion, $c$, and also curved upon the radial lines, and having openings F, the two disks having the ridges $d$ and suitable means for securing the two disks together, substantially as specified.

4. In a damper constructed substantially as described, the disk B, having the oval opening $e$, in combination with the disk C, having lugs $f$, substantially as specified.

DAVID MANUEL.
GEORGE H. BURROWS.

Witnesses:
CHARLES H. DUNHAM,
CHAS. B. EMERSON.